Jan. 16, 1934.  N. L. DAUPLAISE  1,943,299
PICTURE PROJECTION MACHINE
Filed Oct. 18, 1927    2 Sheets-Sheet 2
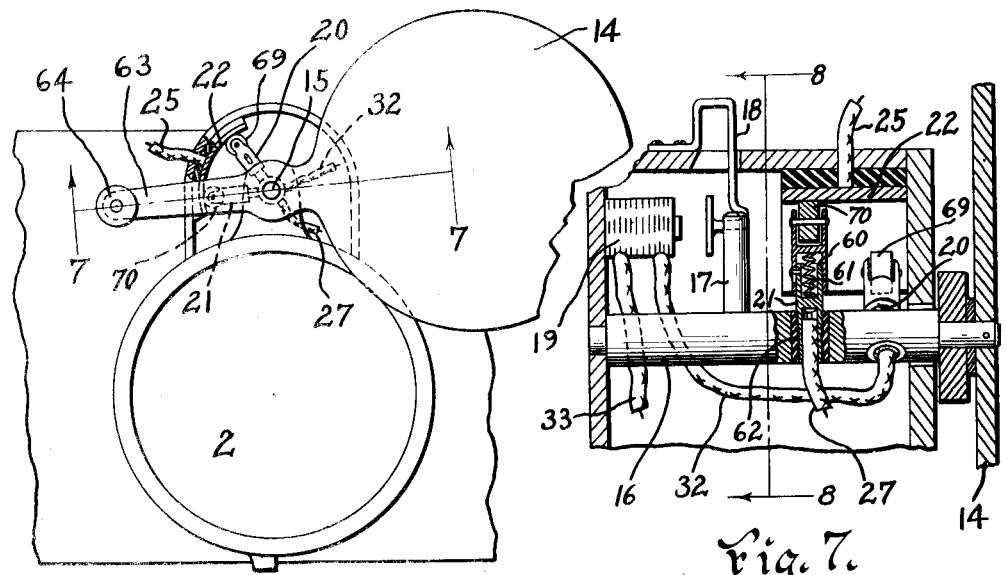
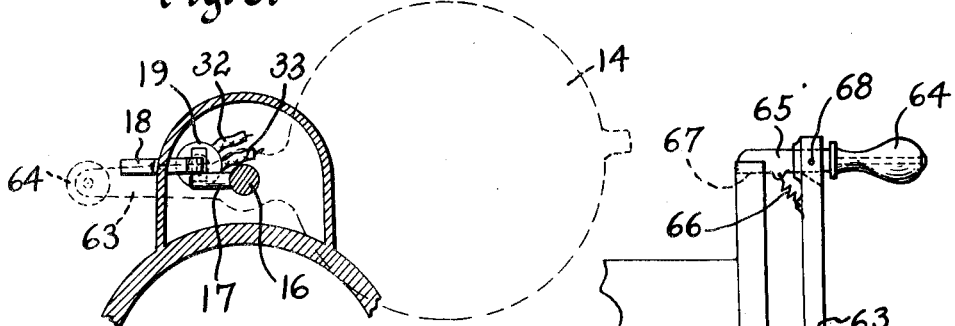
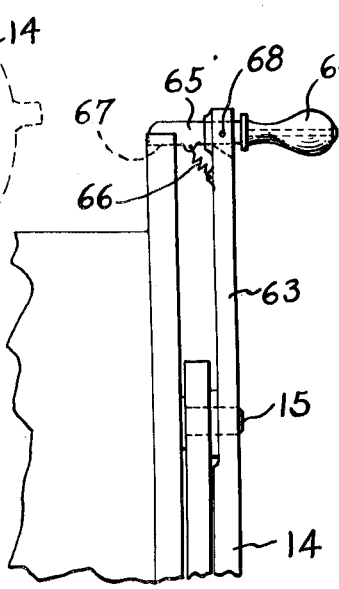
Inventor
Noah Louis Dauplaise.
By Harry H. Styll
Attorney Patented Jan. 16, 1934

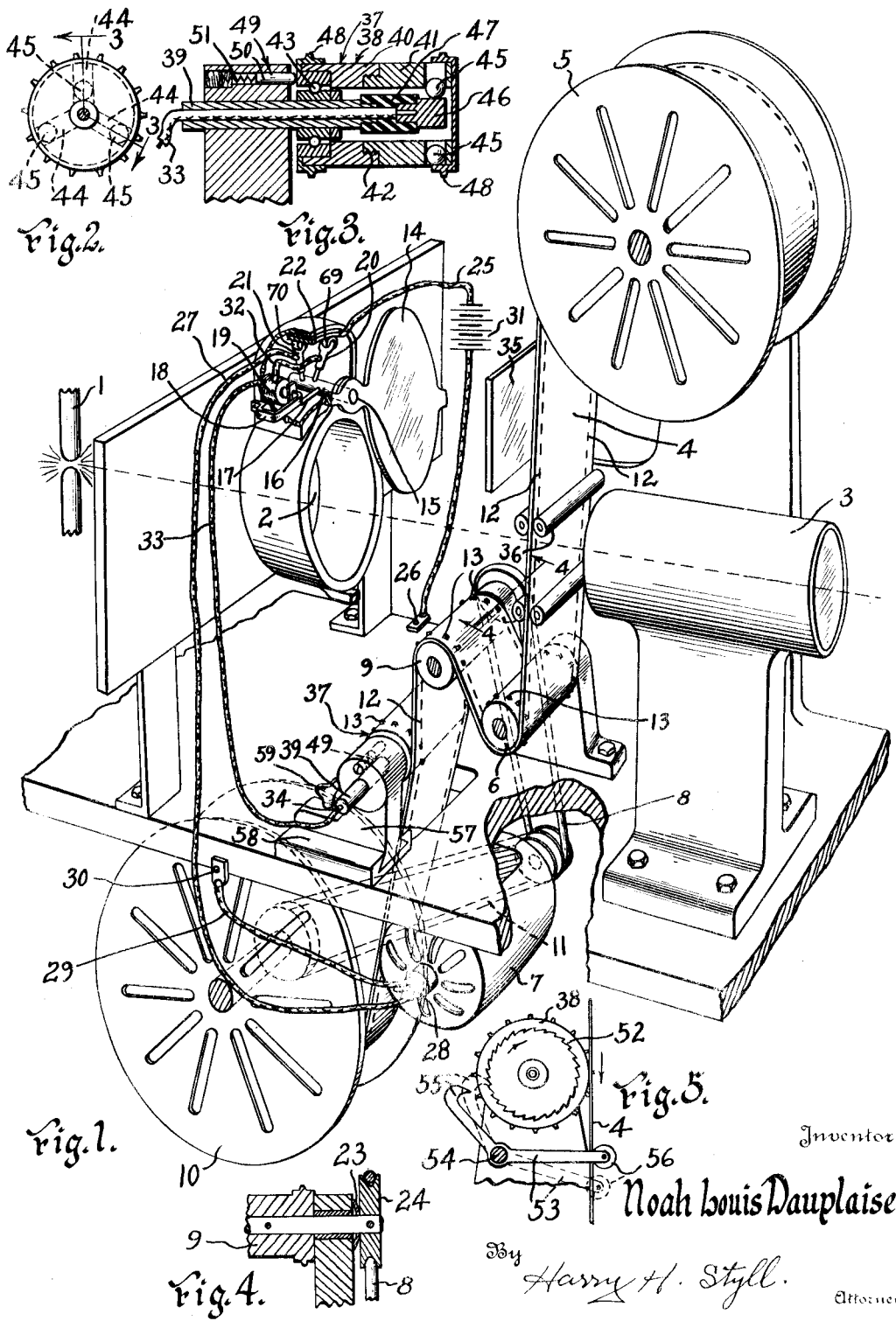

1,943,299

UNITED STATES PATENT OFFICE 1,943,299

PICTURE PROJECTION MACHINE

Noah Louis Dauplaise, Manchester, Conn., assignor, by mesne assignments, to Dauplaise Safety Equipment Corporation, Springfield, Mass., a corporation of Massachusetts Application October 18, 1927. Serial No. 226,904

21 Claims. (Cl. 88—17)

This invention relates to improvements in light and power control for picture projection machines and the like and has particular reference to improved means for shutting off the light and stopping the motive power of the machine when the film becomes jammed, broken, slowed up or slack or when other moving parts of the mechanism are likewise affected.

The principal object of the invention is to provide improved means to interpose an opaque shutter between the light and the film when the film is broken, slowed or slack or any of the moving mechanism of the machine is likewise affected.

Another object of the invention is to provide improved means for stopping the motive power of the machine when the film is slowed, slack or broken or any of the moving parts of the machine are similarly affected.

Another object of the invention is to provide electric circuit controller means that become active on the breaking, slowing or stopping of any of the moving parts of the machine to shut off the power and to interpose an opaque shutter between the light and the film.

Another object of the invention is to provide means for stopping the circuit control means instantly when any of the moving mechanism of the machine is stopped or jammed or broken.

Another object of the invention is to provide improved means for taking up the inertia of the motive power when the current is shut off.

Another object of the invention is to provide improved means whereby when the douser shutter is interposed between the light and the film it cuts off all current to the motor and moving parts of the machine.

Another object of the invention is to provide improved means for preventing the broken film from becoming entangled in the mechanism or being thrown into the line of light where it would be ignited.

Other objects and advantages of the invention will be apparent from the following description taken in connection with the accompanying drawings and it will be understood that many changes may be made in the details of construction and arrangements of parts without departing from the spirit of the invention as expressed in the accompanying claims. I, therefore, do not wish to be limited to the exact details of construction and arrangements of parts shown as the preferred forms have been shown by way of illustration only.

Referring to the drawings:

Fig. 1 is a fragmentary diagrammatic perspective view showing the invention applied to a motion picture projection machine;

Fig. 2 is an end view of the circuit controller;

Fig. 3 is a cross section on line 3—3 of Fig. 2;

Fig. 4 is a section on line 4—4 of Fig. 1;

Fig. 5 is an end view of the circuit controller showing the positive stop;

Fig. 6 is partial front view showing the light chamber and the douser plate in open position;

Fig. 7 is an enlarged cross section on line 7—7 of Fig. 6 looking in the direction of the arrows;

Fig. 8 is a cross section on line 8—8 of Fig. 7 looking in the direction of the arrows;

Fig. 9 is a fragmentary side elevation of the douser plate showing the retaining means for holding the plate in closed position.

Referring to the drawings in which corresponding reference characters denote corresponding parts throughout, the light source 1 is diagrammatically illustrated as an arc light although other forms of light may be used. This light source is placed in the light chamber having the light projecting opening 2. The light proceeds from the light source 1 through the light projection opening 2 into the projection chamber 3 which is provided with the usual projection lenses. The film 4 is carried by the film holder reel 5 and is driven by the roller 9 which in turn is driven by the motor 7 and the belt 8. The film is carried over the intermediate roller 6 which is driven by interrupted impulses to allow each picture on the film to be focused on the screen in the usual manner the roller 9 being provided with the usual clutch (not shown) for that purpose. The film is drawn over the intermittent roller 6 by the roller 9 and is then taken up by the film take up reel 10. The film, of course, travels in the path of the light rays coming from the light chamber to the projection chamber being interposed between those two chambers. The film take up reel 10 is driven by the motor 7 through the belt 11. The film 4 is provided with the usual side perforations 12 which mesh with spur teeth 13 on the rolls 6 and 9. As is well known, the light from the source 1 is very intense and the film 4 is exceedingly inflammable; therefore, if the film 4 were stopped for any reason and the light were not shut off the film would immediately ignite. It is apparent that many accidents may happen to stop the film; for instance, the film may break or jam; the film holder reel may jam; the rollers 6 and 9 may jam or stick; the belt 8 may break; the motor 7 may stick or stop; the film take up reel 10 may jam, stick or stop; the film take up reel belt 11 may break, and the film and moving parts may become slowed or slack. In all these events and in others this stopping or pausing would cause the film to ignite. Also, if there were any inertia in the moving parts the broken film would jam and become torn with possible injury to the moving mechanism of the machine.

It is the principal object, therefore, of my invention to provide simple, efficient and economical means that will prevent these and other like accidents.

Over the opening 2 of the light chamber I provide an opaque douser plate or shutter 14 pivoted at 15 on a shaft 16 which rotates with the shutter 14. On the shaft 16 is a pin 17 which projects under a movable latch 18 which is placed adjacent a solenoid 19. The operation of the shutter 14 is as follows: When the solenoid 19 is energized the latch 18 is pulled over to the solenoid releasing the pin 17 whereupon the shutter 14 drops down over the opening 2 by gravity. Secured to the shaft 16 are two pins or posts 20 and 21 having on their extending ends small rollers 69 and 70. These rollers 69 and 70 engage a contact plate 22 which is inserted in the motor and solenoid circuit. When the shutter 14 drops down to cover the opening 2 in the light chamber the rollers 69 and 70 on the pins 20 and 21 are moved over until they come out of contact with the contact plate 22. This breaks the circuit and shuts off the power from both the solenoid and the motor to stop the motor.

It will be understood that when the current is shut off from the motor the motor will have a certain inertia. It is desirable to have this motor stop just as soon as possible. I, therefore, provide on the end of the roller 9 a friction washer 23 or the like engaging the pulley wheel 24 over which the belt 8 rides. This washer exerts a constant friction on the pulley wheel 24 so that when the current is shut off this will tend to drag the motor and stop its inertia.

The motor circuit is provided by the lead 25 grounded at 26 at one end and engaging the contact plate 22 at the opposite end flowing through the roller post 21 through the lead wire 27 which runs to and is attached to the motor as shown at 28. The circuit then goes through the motor into the lead 29 which is grounded at 30 which completes the circuit through the machine to the point 26. The source of current is indicated at 31 which may be connected with any usual source of power.

The solenoid circuit comes through the lead 25 to the contact plate 22 through the post 20 through the lead 32 to the solenoid 19, passes through the solenoid and along the lead 33 which is secured to the circuit controller at 34. The circuit controller is grounded on the bed of the machine and forms a circuit through the bed plate to the point 26 and lead 25.

A guard plate 35 is provided to prevent the film from flying and the film is guided through the guide rollers 36. A solenoid circuit controller 37 which will be described in detail hereafter is operated by the film to complete the circuit when the film is broken, slack or slowed or any of the moving parts of the machine are slowed, broken or stopped. The details of construction of the solenoid circuit controller are shown in Fig. 2 and Fig. 3. A hollow roller member 38 is rotatably pivoted on the bearing shaft 39. The hollow roller may be made in two parts 40 and 41, screw threaded or otherwise secured together at 42 for access to the internal chamber thereof. The roller 38 is mounted on the ball bearings 43 which are arranged in the internal chamber. Adjacent one end of the internal chamber of the roller are a plurality of race-ways or ball guides 44 containing the metal or electrical conductor balls 45. Centrally of the balls is located the metal contact 46 into which the lead 33 is carried through the shaft 39. The shaft 39 is separated from the contact 46 by the insulating sleeve 47. On the exterior of the hollow roller 38 are the teeth 48 which engage with the perforations 12 in the edge of the film 4. The moving film 4 through the engagement of its perforations 12 with the teeth 48 rotate the roller 38. The rotation of the roller 38 throws the balls 45 towards the outer periphery of the roller 38, keeping the balls 45 out of engagement with the contact 46. If the rotation of the roller 38 is stopped or slowed some one of the balls 45 will drop down into engagement with the contact 46 closing the circuit through the lead 33 and the ground through the walls 40 and 41 of the roller 38. When the contact is made and the circuit closed the solenoid 19 will be energized to draw over the latch 18 and drop the shutter 14. It is apparent that as the film 4 travels at a high rate of speed if the film is broken or slowed sufficiently the roller 38 will have considerable inertia and tend to rotate a considerable time before coming to a stop to allow the balls 45 to drop down and contact with the contact 46. I, therefore, provide a friction brake 49 comprising a plunger 50 and a spring 51, the plunger 50 engaging the end of the roller 38 keeping it under friction all the time so that when the film is broken or slowed there will be a tendency to stop rotation of the roller 38. In addition to the friction brake I have provided a positive brake as shown in Fig. 5, which brake consists of a member having the teeth 52 on the roller 38 and a bell crank lever 53 pivoted at 54 and having a pawl 55 engaging the teeth 52. The other end of the bell crank lever 53 is provided with a roller 56 which engages the film 4. As long as the film 4 is engaging the roller 38 the pawl 55 will be out of contact with the teeth 52 on the roller 38, but if the film is broken the bell crank arm 53 will drop down by gravity forcing the pawl 55 into contact with the teeth 52 and stop rotation of the roller 38. The solenoid circuit controller 37 is mounted on a bracket 57 which slides in the slide-way 58. This allows of adjustment of the controller 37 in and out to insert or remove the film and to put the proper pressure thereon, it being locked in adjusted position by the screw 59. It will be understood that the wire of the lead 33 is insulated in the shaft 39.

Fig. 7 shows in detail the trip and the douser plate means for shutting off the power. It will be noted that the lead 27 enters the post 21 which carries the roller 70 which is mounted on a telescoping sleeve 60 carrying the spring 61 to give a resilient contact between the roller 21 and the contact plate 22. The post 20 is insulated from the shaft 16 by the insulation sleeve 62. The two posts shown are identical in construction. The douser plate has an extending arm 63 carrying the handle 64 by means of which the douser plate may be swung to open the opening 2 in the light chamber. To close the light chamber press finger on latch 18 releasing pin 17 whereupon the shutter 14 drops down over opening 2 by gravity. This operation stops the machine.

In Fig. 9 is shown the means for holding the douser plate in closed position, which consists of a latch 65 yieldingly supported by the spring 66, the latch 65 engaging in a recess 67 in the cover portion of the hood containing the mechanism for the solenoid control and the control for shutting off the power is pivoted at 68 to the arm 63 and may be removed from the recess 67 by exerting pressure on the handle 64.

The operation of starting the machine is as follows: The shutter plate 14 is opened on its pivot 15 rotating the shaft 16. This brings the roller 70 of the motor circuit first into contact with the contact plate 22 to start the motor. This causes the film 4 to move, which in turn rotates the solenoid controller 37 throwing the balls 45 out of contact with the contact plate 46. This allows the contact 69 of the solenoid circuit to be brought into contact with the plate 22 to form a complete circuit which is ready to be energized when the solenoid control 37 is stopped and the balls 45 come in contact with the contact 46 to operate the solenoid to close the douser plate and stop the machine.

It is of course clear that instead of closing the circuit when the balls drop down by gravity, the operation may be reversed and the circuit closed when the balls are thrown out to their outermost position suitable adjustment being made in the circuit and mechanism to accomplish the reversal.

In motion picture play projection two machines are usually utilized, one machine running and the other loaded with the continuation of reel on the the first machine hence it is of great importance that the first machine may be instantly stopped when its reel is exhausted and the second machine started without undue interruption at the time of performing this operation the operator of the two machines has one hand on the latch of the douser plate of the running machine and the other hand on the handle of the douser plate of the quiet machine. When the film on the first machine reaches its end the operator simply presses the latch which allows the douser plate to drop down and shut off the power of the machine, at the same time he raises the douser plate on the quiet machine thus turning on the power and starting the machine. This practically instantaneous operation of the two machines is a great advantage of my invention and it is not now possessed by any other machines so far as I am aware.

From the foregoing description the construction and operation of the device will be understood and it will be seen that I have provided simple, efficient, automatic and economical means for carrying out the objects of the invention and particularly to interpose an opaque shutter between the light and the film and to stop the motive power of the machine when the film is broken or slowed or slack or any of the moving parts of the machine are broken, stopped or jammed, and that I have provided additional and improved means to make the operation not only automatic but practically instantaneous.

Having described my invention, I claim:

1. In a device of the character described, a movable belt like band, means for moving the band, a rotatable circuit controller engaging and rotated by the band, electric circuits one containing the means for moving the band, and the other the circuit controller, said controller having movable contact members that gravitationally close the controller circuit when the controller is not rotating and break said circuit when the controller is rotated through the centrifugal force of the rotating controller to start and stop the means for moving the band, serrations on the rotatable circuit controller, a pawl lever operated by the band and adapted to be held out of contact with the serrations when the pawl lever is engaged by the band and to drop down by gravity and engage the serrations when the band is broken.

2. In a device of the character described, a band-like member, means for moving the band-like member, a rotatable circuit controller engaging and being rotated by the band-like member, said controller containing an electric circuit with a separated space therein and a plurality of movable contact members adapted to move away from said space by centrifugal force generated by rotation of the controller and to close said space gravitationally when the controller is not rotating, means engaging the rotating controller and a spring for resiliently urging said means towards the controller whereby the inertia of the rotating controller is taken up when the rotating means is removed or broken.

3. In a projection apparatus, a source of illumination, a shutter movable across the path of the illumination, a control circuit adapted to control the movement of the shutter across the path of the illumination, means to carry the image to be projected, motor means to move the image carrying means, a motor circuit to control said motor means, means operable by the shutter to make or break the control circuit, and means operable by the shutter to make or break the motor circuit.

4. In a projection apparatus, a source of illumination, a shutter having a rotatable pivot shaft, said shutter being movable across the path of the illumination, a control circuit adapted to control the movement of the shutter across the path of the illumination, means for carrying the image to be projected, motor means to move the image carrying means, a motor circuit to control said motor means, means on the shaft of the shutter to make or break the control circuit, and means on the shaft of the shutter to make or break the motor circuit.

5. In a projection apparatus, a source of illumination, a shutter having a rotatable pivot shaft, said shutter being movable across the path of the illumination, a control circuit adapted to control the movement of the shutter across the path of the illumination, means for carrying the image to be projected, motor means to move the image carrying means, a motor circuit to control said motor means, roller means on the shaft in the shutter to make or break the control circuit, and roller means on the shaft of the shutter to make or break the motor circuit.

6. In a projection apparatus, a source of illumination, a shutter having a rotatable pivot shaft, said shutter being movable across the path of the illumination, a control circuit adapted to control the movement of the shutter across the path of the illumination, means for carrying the image to be projected, motor means to move the image carrying means, a motor circuit to control said motor means, contact means on the shaft of the shutter to make or break the control circuit, and contact means on the shaft of the shutter to make or break the motor circuit.

7. In a projection apparatus, a source of light for the projection of images, a projection strip carrying the images to be projected, motor means for feeding the strip, a motor circuit, a control circuit, a rotatable circuit breaker in the control circuit engaging and driven by the projection strip, said circuit breaker having an open space in the circuit and a plurality of circuit closing members that are thrown out of contact at the open space when the circuit breaker is rotating and which will drop down by gravity and close the open space when the breaker is not rotating to close the control circuit, a shutter pivoted so that it may be rotated by gravity into the path of the projected light, a trip for the shutter, a solenoid in the control circuit adapted to operate the trip when the control circuit is closed by the circuit breaker to drop the shutter into the path of the light, a roller switch movable with the shutter adapted to break and close the control circuit, and a second roller switch movable with the shutter adapted to break the motor circuit when the shutter is dropped over the light.

8. In a projection machine, a control circuit, a motor circuit, a source of light for projecting images, a shutter pivoted so that it may be rotated on its pivot into the path of light, a release on the shutter, a solenoid in the control circuit adapted to operate the release, a roller switch movable with the shutter adapted to close and open the control circuit and a second roller switch movable with the shutter adapted to close and open the motor circuit.

9. In a device of the character described, a source of light for projecting images, a control circuit, a motor circuit, a shutter pivoted on a shaft so that it may be rotated on its pivot into the path of the light, trip means for holding the shutter in open position, a solenoid in the control circuit adapted to release the trip when the circuit is closed, a switch on the shaft adapted to open and close the control circuit as the shutter is rotated, and a second switch on the shaft of the shutter adapted to open and close the motor circuit as the shutter is rotated.

10. In a projection apparatus, a source of illumination, a shutter movable across the path of the illumination, a control circuit adapted to control the movement of the shutter across the path of the illumination, means to carry the image to be projected, motor means to move the image carrying means, a motor circuit to control said motor means, means operable by the shutter to make or break the control circuit, means operable by the shutter to make or break the motor circuit, and means operable by the image carrying means to make or break the control circuit.

11. In a projection apparatus, a source of illumination, a shutter having a rotatable pivot shaft said shutter being movable across the path of the illumination, a control circuit adapted to control the movement of the shutter across the path of the illumination, means for carrying the image to be projected, motor means to move the image carrying means, a motor circuit to control said motor means, means on the shaft of the shutter to make or break the control circuit, means on the shaft of the shutter to make or break the motor circuit, and means operable by the image carrying means to make or break the control circuit.

12. In a projection apparatus, a source of illumination, a shutter having a rotatable pivot shaft said shutter being movable across the path of the illumination, a control circuit adapted to control the movement of the shutter across the path of the illumination, means for carrying the image to be projected, motor means to move the image carrying means, a motor circuit to control said motor means, roller means on the shaft in the shutter to make or break the control circuit, roller means on the shaft of the shutter to make or break the motor circuit, and means operable by the image carrying means to make or break the control circuit.

13. In a projection apparatus, a source of illumination, a shutter having a rotatable pivot shaft said shutter being movable across the path of the illumination, a control circuit adapted to control the movement of the shutter across the path of the illumination, means for carrying the image to be projected, motor means to move the image carrying means, a motor circuit to control said motor means, contact means on the shaft of the shutter to make or break the control circuit, contact means on the shaft of the shutter to make or break the motor circuit, and means operable by the image carrying means to make or break the control circuit.

14. In a projection apparatus, a source of light for the projection of images, a projection strip carrying the images to be projected, motor means for feeding the strip, a motor circuit, a control circuit, a rotatable circuit breaker in the control circuit engaging and driven by the projection strip, said circuit breaker having an open space in the circuit and a plurality of circuit closing members that are thrown out of contact at the open space when the circuit breaker is rotating and which will drop down by gravity and close the open space when the breaker is not rotating to open or close the control circuit, a shutter pivoted so that it may be rotated by gravity into the path of the projected light, a trip for the shutter, a solenoid in the control circuit adapted to operate the trip when the control circuit is actuated by the circuit breaker to drop the shutter into the path of the light, a roller switch movable with the shutter adapted to break and close the control circuit, and a second roller switch movable with the shutter adapted to break and close the motor circuit when the shutter is rotated.

15. In a projection machine, a control circuit, a motor circuit, a source of light for projecting images, a shutter pivoted so that it may be rotated on its pivot into the path of light, a release on the shutter, a solenoid in the control circuit adapted to operate the release, a roller switch movable with the shutter adapted to close and open the control circuit, a second switch movable with the shutter adapted to close and open the motor circuit, and means operable by the image carrying means to make or break the control circuit.

16. In a device of the character described, a source of light for projecting images, a control circuit, a motor circuit, a shutter pivoted on a shaft so that it may be rotated on its pivot into the path of the light, trip means for holding the shutter in open position, a solenoid in the control circuit adapted to release the trip when the circuit is closed, a switch on the shaft adapted to open and close the control circuit as the shutter is rotated, a second switch on the shaft of the shutter adapted to open and close the motor circuit as the shutter is rotated, and means operable by the image carrying means to make or break the control circuit.

17. In a device of the character described, a film with openings therein, a motor means for driving the film, a motor circuit to control the motor means, means for closing and breaking the motor circuit, a rotatable switch member having projections extending into the openings in the film and having lever engaging means thereon, said switch member being rotated by the film, and having gravity contact means, a control circuit connected with the switch member closable by the gravity contact means when the switch is not rotating or has been slowed down, said control circuit operating the means for breaking and closing the motor circuit to stop the film driving means when the control circuit is closed, a pivoted lever having one end engaging the film and the other constructed to engage the lever engaging means on the switch member, said engaging end being out of engagement when the other end is bearing on the film and moving into engagement when the other end is thrown out of engagement with the film by the breaking thereof, said lever stopping the rotation of the switch member when the film breaks to close the control circuit.

18. In a power stopping and starting device, a power transmitting member, power means to move the same, an electric circuit for controlling the power means, an electric circuit for controlling the first circuit, a movable switch in the second circuit actuated by the power transmitting member, and a second movable switch having a contact thereon that opens and closes the circuit for controlling the power means as the switch is moved and a second contact thereon, spaced from the first contact, that opens and closes the second circuit as the switch is moved, said second switch being actuated by the operation of the first switch.

19. In a power stopping and starting device, a power transmitting member, power means to move the same, an electric circuit for controlling the power means, an electric circuit for controlling the first circuit, a rotatable switch in the second circuit actuated by the power transmitting member, and having gravity contact means for opening and closing said circuit as the speed of the power transmitting member is changed, a second rotatable switch having a contact thereon that opens and closes the circuit for controlling the power means as the switch is rotated and a second contact thereon that opens and closes the second circuit as the switch is rotated, said contacts being spaced apart, and said second switch being actuated by the operation of the first switch.

20. In a power stopping and starting device, a power transmitting member, power means to move the same, an electric circuit for controlling the power means, an electric circuit for controlling the first circuit, a movable switch in the second circuit actuated by the power transmitting member, a second movable switch having a contact thereon that opens and closes the first circuit as the switch is moved, and a contact thereon that opens and closes the second circuit as said switch is moved, said contacts being spaced apart and means for moving the second switch actuated by the second circuit and the first switch therein.

21. In a power stopping and starting device, a power transmitting member, power means to move the same, an electric circuit for controlling the power means, an electric circuit for controlling the first circuit, a movable switch in the second circuit actuated by the power transmitting member, a second movable switch having a contact thereon to open and close the first circuit as the switch is moved and a contact thereon to open and close the second circuit as the switch is moved, said contacts being spaced apart, and means to move the second switch whereby when the first switch operates the contacts in the second circuit the said means moves the second switch to operate the contacts in the first and second circuits successively.

NOAH LOUIS DAUPLAISE.